(12) United States Patent
Gabbai

(10) Patent No.: US 10,339,497 B2
(45) Date of Patent: Jul. 2, 2019

(54) SYSTEM AND METHOD FOR DYNAMIC INVENTORY MANAGEMENT

(71) Applicant: eBay Inc., San Jose, CA (US)

(72) Inventor: Jonathan Gabbai, London (GB)

(73) Assignee: eBay Inc., San Jose, CA (US)

( * ) Notice: Subject to any disclaimer, the term of this patent is extended or adjusted under 35 U.S.C. 154(b) by 166 days.

(21) Appl. No.: 15/216,463

(22) Filed: Jul. 21, 2016

(65) Prior Publication Data
US 2018/0025310 A1    Jan. 25, 2018

(51) Int. Cl.
*G06Q 10/08* (2012.01)
*G06Q 10/04* (2012.01)

(52) U.S. Cl.
CPC ........... *G06Q 10/087* (2013.01); *G06Q 10/04* (2013.01)

(58) Field of Classification Search
CPC ........ G06Q 10/00; G06Q 10/08; G06Q 10/06; G06F 3/14; G06F 3/16; G06F 19/00; G06F 17/00
USPC ............... 705/28, 7.42, 7.38, 80; 340/572.1; 345/633
See application file for complete search history.

(56) References Cited

U.S. PATENT DOCUMENTS

| | | |
|---|---|---|
| 8,423,431 B1 | 4/2013 | Rouaix et al. |
| 8,468,066 B2 | 6/2013 | Goldberg et al. |
| 8,930,133 B2 | 1/2015 | Wurman et al. |
| 9,132,957 B1 | 9/2015 | Girdhar et al. |
| 9,171,278 B1 | 10/2015 | Kong et al. |
| 9,216,857 B1 | 12/2015 | Kalyan et al. |
| 9,489,655 B1* | 11/2016 | Lecky ................. G06Q 10/0875 |
| 2001/0045893 A1* | 11/2001 | Swartzel ................ G06K 17/00 340/572.1 |
| 2006/0210115 A1 | 9/2006 | Nemet |

(Continued)

FOREIGN PATENT DOCUMENTS

WO    2018/017838 A1    1/2018

OTHER PUBLICATIONS

International Search Report received for PCT Application No. PCT/US2017/043080, dated Sep. 29, 2017, 2 pages.

(Continued)

*Primary Examiner* — Olusegun Goyea
(74) *Attorney, Agent, or Firm* — Schwegman Lundberg & Woessner, P.A.

(57) ABSTRACT

A system, method, and computer program product for managing a physical inventory. Image data from a number of cameras is processed to recognize inventory items from identifying indicia and determine their respective locations to build a three-dimensional model of the inventory item distribution. Comparison with a database model of the inventory item distribution may indicate discrepancies, such as misplaced items. A picking agent may be dispatched to pick a target item by following a particular path, which may be designated in an overlay on a portable heads-up display. The picking agent may also perform a corrective inventory management action on a non-target item while picking the target item. The corrective inventory management action may include repositioning an item, reorienting the item for better visibility of its identifying indicia, replacing the item's identifying indicia, determining if the item is of expected weight, and gathering new image data.

17 Claims, 7 Drawing Sheets

(56) References Cited

U.S. PATENT DOCUMENTS

| | | | |
|---|---|---|---|
| 2007/0219816 A1* | 9/2007 | Van Luchene | G06Q 10/06 705/80 |
| 2008/0077511 A1 | 3/2008 | Zimmerman | |
| 2010/0171826 A1 | 7/2010 | Hamilton et al. | |
| 2011/0035247 A1* | 2/2011 | Perry | G06Q 10/06 705/7.38 |
| 2013/0317950 A1 | 11/2013 | Abraham et al. | |
| 2014/0092241 A1 | 4/2014 | Brinkman et al. | |
| 2014/0279294 A1* | 9/2014 | Field-Darragh | G06Q 10/087 705/28 |
| 2015/0062160 A1* | 3/2015 | Sakamoto | H04N 17/002 345/633 |
| 2015/0088703 A1* | 3/2015 | Yan | G06F 3/147 705/28 |
| 2016/0034846 A1 | 2/2016 | West et al. | |
| 2016/0117627 A1* | 4/2016 | Raj | G06Q 10/06398 705/7.42 |
| 2016/0171597 A1 | 6/2016 | Todeschini | |

OTHER PUBLICATIONS

International Written Opinion received for PCT Application No. PCT/US2017/043080, dated Sep. 29, 2017, 4 pages.
International Application Serial No. PCT/US2017/043080, Article 19 Amendment filed Nov. 27, 2017, 6 pages.
Amendment filed on Feb. 20, 2019 for Korean Patent Application No. 10-2019-7004988, 2 pages (1 page Official Copy and 1 page English Translation).
Extended European Search Report Received for European Patent Application No. 17831875.4, dated Apr. 5, 2019, 8 pages.
International Preliminary Report on Patentability received for PCT Application No. PCT/US2017/043080, dated Jan. 31, 2019, 6 pages.

* cited by examiner

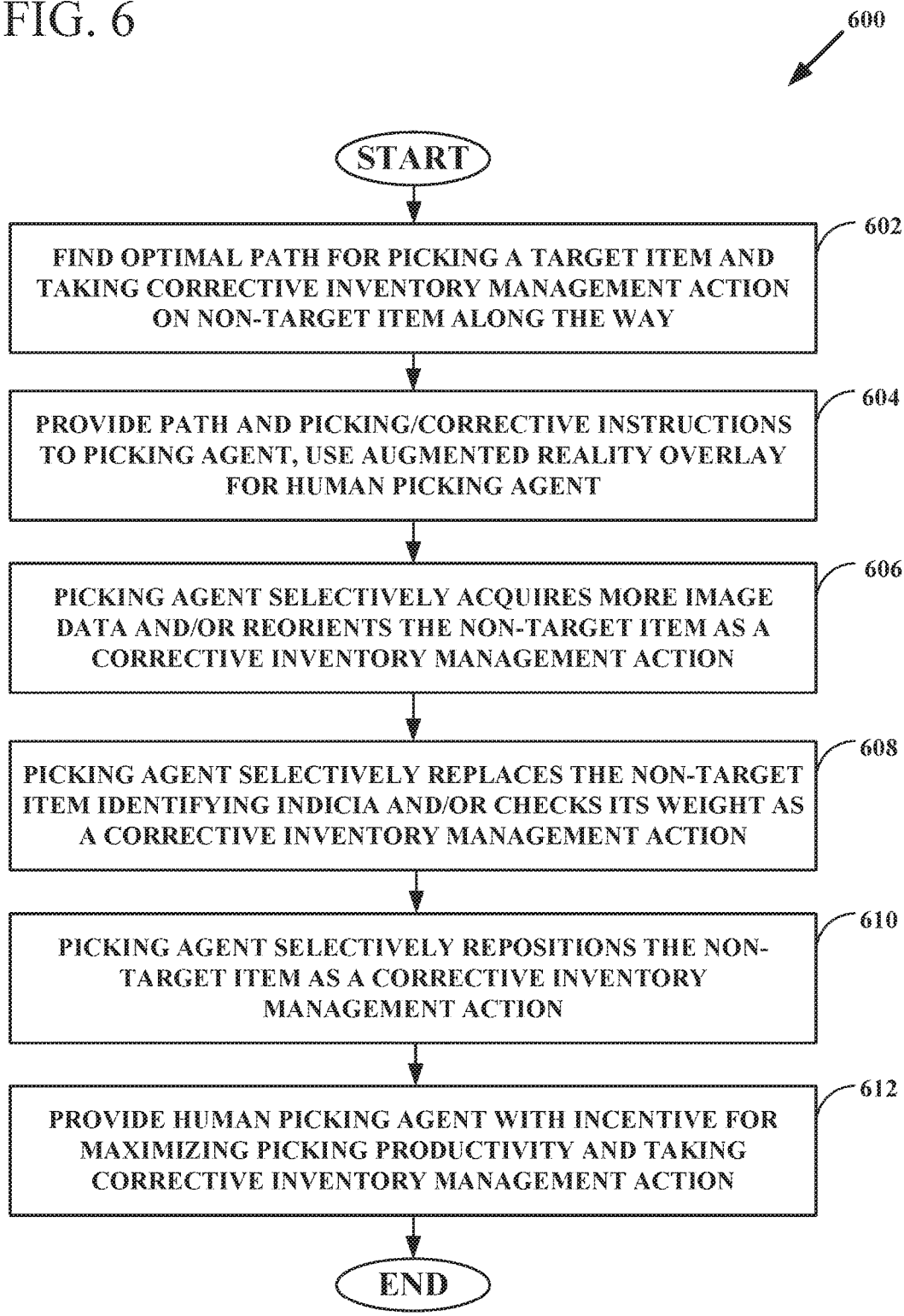

SYSTEM AND METHOD FOR DYNAMIC INVENTORY MANAGEMENT

TECHNICAL FIELD

The present disclosure relates to dynamic physical inventory management, such as for an order fulfillment operation, warehouse, or factory.

BACKGROUND

As the use of network-based publication systems and marketplaces such as on-line commerce services or auction services expands, and the volume of item listings in such applications increases, the speed and efficiency with which selected products may be picked from an inventory, packed for shipment, and delivered increases in importance to customers.

BRIEF DESCRIPTION OF DRAWINGS

Some embodiments are illustrated by way of example and not limitation in the figures of the accompanying drawings in which:

FIG. 6 is a flow chart illustrating a method for executing corrective inventory management actions, in accordance with a disclosed embodiment.

DETAILED DESCRIPTION

Figure 1:
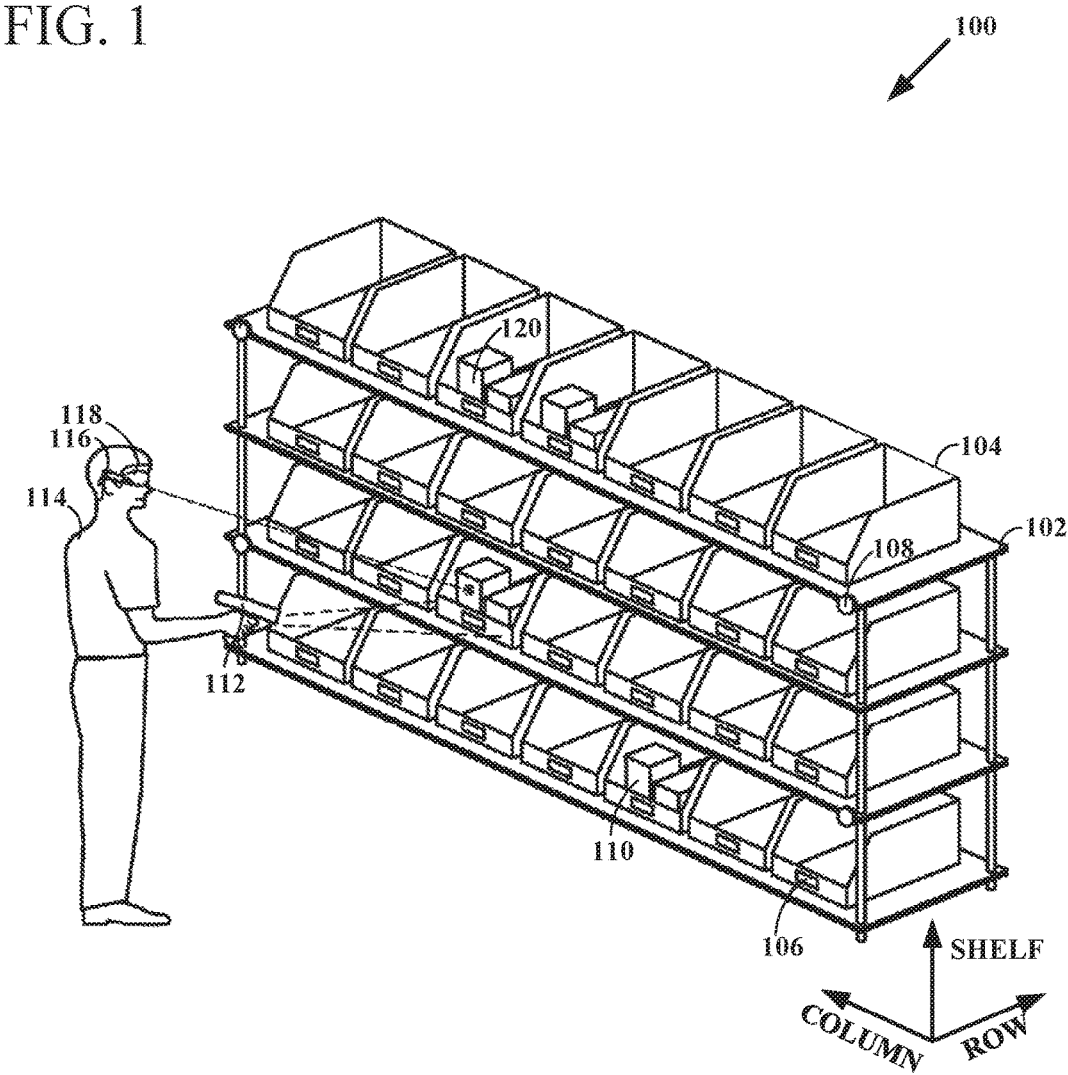
FIG. 1 is diagrammatic representation of an inventory handling facility, in accordance with a disclosed embodiment.

In the following description, for purposes of explanation, numerous specific details are set forth in order to provide a thorough understanding of some example embodiments. It will be evident, however, to one skilled in the art that the present embodiments may be practiced without these specific details. Examples merely typify possible variations. Unless explicitly stated otherwise, components and functions are optional and may vary in sequence or be combined or subdivided.

Retailers, wholesalers, and other product distributors typically maintain an inventory of various items that may be ordered by clients or customers. Similarly, manufacturers may maintain an inventory of parts and/or materials for use in manufacturing processes. The inventory may be maintained and processed at an inventory handling facility, such as a warehouse, distribution center, store, or factory, for example.

When a customer places an order, one or more inventory items specified in the order are to be retrieved or "picked" from the inventory, packed for the customer, and delivered. In a large inventory with many different items, it may be very inefficient for a single employee to physically locate and pick every item for a given order. Different items may be stored at widely separated locations in the inventory handling facility, so a single "picking agent" may need to traverse a long path through the facility to pick the needed items. A number of picking agents may therefore be sent to each pick a selected number of items to meet the order.

In recent years, the entire pick-pack-deliver process has become increasingly automated. The picking agents may therefore include a human employee or an automated device that can perform a similar function. Likewise, either a live agent or an automated agent or some combination of both may process incoming inventory items, to place them for example in a particular position in the inventory handling facility.

A database may track incoming inventory items and their assigned positions in the inventory handling facility. The database may also track outgoing inventory items, so that current stock at any given moment may be determined. However, the database model of the inventory items may not match the actual physical inventory stored in the inventory handling facility.

This problem may occur for many different reasons. Incoming inventory items may be placed into an improper position, or may be dropped during stocking or picking of other nearby items for example. Inventory items may also be mismarked, perhaps because the original providers mixed up items during their own pick-pack-deliver process.

The objective of any inventory handling facility may generally be to stock incoming inventory items and then pick outgoing inventory items for packaging and delivery as efficiently as possible. Inventory management efficiency may be defined in terms of many performance variables, such as the number of items that may be picked per unit time per picking agent, the percentage of time the inventory handling facility is actively picking items rather than undergoing maintenance or other unproductive activity, and the percentage of correctly processed orders, for example. An efficiently run inventory system can minimize costs for a provider of items, and those savings may be passed onto consumers.

The present inventor has realized, among other things, that inventory management efficiency may be improved by making the pick-pack-deliver process more dynamic. That is, rather than relying on a database model of what the inventory and its distribution throughout the inventory handling facility should be, a methodology that actively determines the true physical inventory and its actual distribution in the inventory handling facility in an ongoing manner could provide benefits to both item providers and consumers. Providers could have their items delivered more quickly, at lower cost, and with fewer errors. Customers may receive their items faster and at a lower price. It is therefore useful and helpful to enable a system and method for dynamically managing a physical inventory that ensures that discrepancies between a database inventory model and an actual inventory status are identified and reconciled, ideally in substantially real time.

FIG. 1 is a diagrammatic representation of an inventory handling facility 100, in accordance with a disclosed embodiment. Such facilities are typically arranged with alternating storage areas and access pathways that may be traversed by picking agents. The storage areas may comprise a stack of shelves 102 to allow items to be arrayed vertically at a given location on a floor, for example. A particular position within the facility 100 may be designated by a set of coordinates, such as a row number, column number, and shelf number, in addition to particular corresponding x-y-z distance coordinates.

In some inventory handling facilities 100, items may be stored in separate bins 104, which may be numbered and labelled with a bin identifier 106. The inventory handling facility 100 may have various location markers 108 to denote a given physical location. Inventory items 110 and 112 may have identifying indicia of their own, used to facilitate item check-in during stocking and check-out during order fulfillment activities.

Bin identifiers 106, location markers 108, and various item identifying indicia may be machine-readable. For example, each of these may comprise an optical identifier such as a barcode or conventional alphanumeric characters. A scanning device such as a bar code reader or camera 112 may therefore acquire image data that may be processed to determine the identity and location of a given physical item in the inventory. For simplicity, all such devices are referred to as cameras in this disclosure. A camera may be hand-held as shown with respect to item 112, or may be attached to or worn by the picking agent 114, as shown with respect to item 116. Cameras may also be fixed to particular locations in the inventory handling facility 100. The picking agent 114 may also have a portable heads-up display 118, as will be described.

Figure 2:
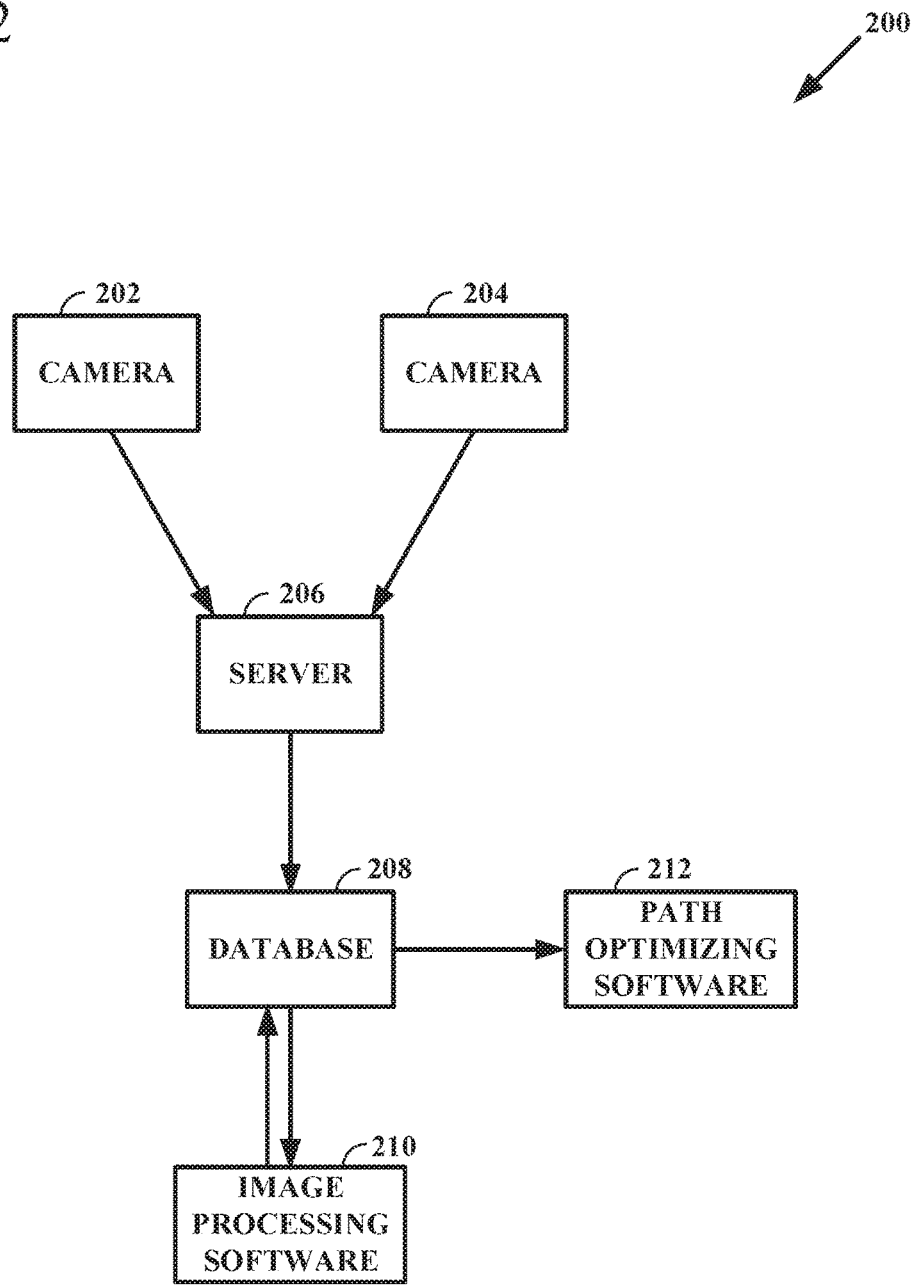
FIG. 2 is a diagrammatic representation of a system for capturing and processing image data, in accordance with a disclosed embodiment.

FIG. 2 is a diagrammatic representation of a system 200 for capturing and processing image data, in accordance with a disclosed embodiment. The system 200 may include any number of cameras, such as cameras 202 and 204 shown. The cameras may produce image data from throughout the inventory handling facility 100 and transmit the image data to a server 206, for example through a wireless network. The server 206 may store the image data in a database 208, which may also store a database model for the inventory distribution based on incoming inventory items, the positions where each incoming inventory item should be stored, and which inventory items should be picked for order fulfillment.

Software applications such as image processing software 210 for example may recognize inventory item identifying indicia in an image to determine that a particular inventory item is in the image frame. The image processing software 210 may also identify barcodes or alphanumeric character strings in an image to determine that a particular bin identifier 106 or a particular location marker 108 is in the image frame. The image data and the respective positions of the cameras, such as items 202 and 204, that acquired the image data may yield a three-dimensional model or map of how inventory items are actually distributed in the inventory handling facility 100.

For an example, an image may include a particular location marker 108 in its lower left corner, a particular bin identifier 106 in the central area of the image, and an inventory item identifier just above the bin identifier 106. The image processing software 210 may recognize the particular location marker 108 and the physical location previously assigned to it, for example in terms of row, column, and shelf coordinates. The image processing software 210 may also recognize the bin identifier 106 and determine that it is at the physical location previously assigned to it, based on the relative spacing between the location marker 108 and the bin identifier 106 in a particular image. The image processing software 210 may also recognize the item identifier and determine that the corresponding item is in the correct bin and physical location assigned to it. That physical location may correspond to a location first assigned to the item when it first arrived and was stored in the inventory handling facility 100, or to a subsequent location to which the item was known to be moved.

However, the image processing software 210 may also determine that the particular recognized item is misplaced, meaning there is a discrepancy between the database model of inventory distribution and the actual inventory distribution as determined by the actual image data. Further, in some instances, the image processing software 210 may not be able to recognize a given inventory item because its identifying indicia may not be visible in any of the images available for processing. The identifying indicia may be missing or merely obscured from clear view of a camera. The identifying indicia may also have been damaged during shipping and handling to the inventory handling facility 100, or thereafter.

The image processing software 210 may therefore provide to database 208 the results of its analysis of the image data. The results may include a three-dimensional model of the actual inventory distribution in the inventory handling facility 100, such as a list of inventory items and the physical location of each item. Discrepancies between the actual distribution and the database distribution may also be logged by the image processing software 210 in one embodiment. In other embodiments, other software applications may log these discrepancies. For example, path optimizing software 212 that would normally determine the optimal paths for a number of picking agents 114 to follow for assembling an order may also perform a comparison between the database inventory model and the image based inventory model to identify inventory discrepancies.

Figure 3:
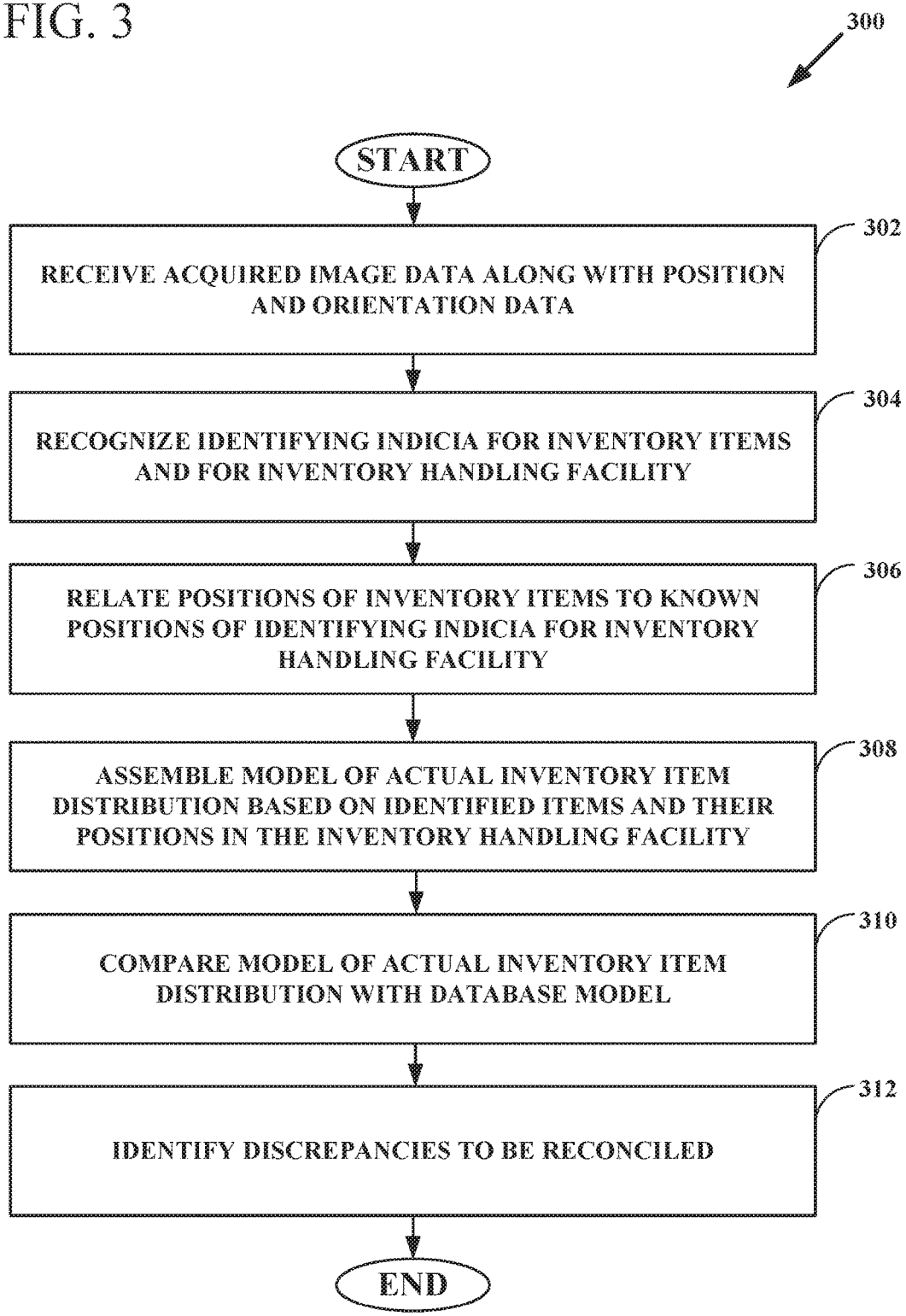
FIG. 3 is a flow chart illustrating a method for creating a three-dimensional physical inventory distribution model, in accordance with a disclosed embodiment.

FIG. 3 is a flow chart illustrating a method 300 for creating a three-dimensional physical inventory distribution model, in accordance with a disclosed embodiment. The method may generally follow the operation of the system described above, and may be implemented as a set of program instructions that are stored in a computer-readable medium and executed by at least one processor. At 302, the method may receive acquired image data from any number of cameras. The image data may also include data regarding the position and orientation of each camera that provided the image. Further, the type of each camera may be noted, so that geometric processing of the image may compensate for the known optical properties of the imaging system involved, such as its field of view and focal length.

At 304, the method may recognize identifying indicia for any number of inventory items and for any number of the location markers 108 and/or the bin identifiers 106. At 306, the method may relate the positions of the inventory items to known positions of the identifying indicia for the inventory handling facility 100. That is, the inventory handling facility 100 when first established may have the positions of any number of its location markers 108 logged and stored. The bin identifiers 106 may have fixed location assignments, or they may be allowed to be moved within the inventory handling facility 100 to subsequently assigned locations that are also logged and stored. At 308, the method may compare the relative positions of the inventory items with the positions of known reference points of various kinds in the acquired image data, to determine an absolute inventory item position from the image data.

At 310, the method may compare the model of the actual inventory item distribution based on the image data with the model of the 'proper' inventory model stored in the database. The database model describes how the inventory should be distributed, based on item storage and removal, and in the ideal case this model is always entirely accurate. Differences may exist however. At 312, the method may identify discrepancies in the inventory distributions that are to be reconciled. The method may ignore position differences that are below a predetermined threshold, as these may not be significant.

Figure 4:
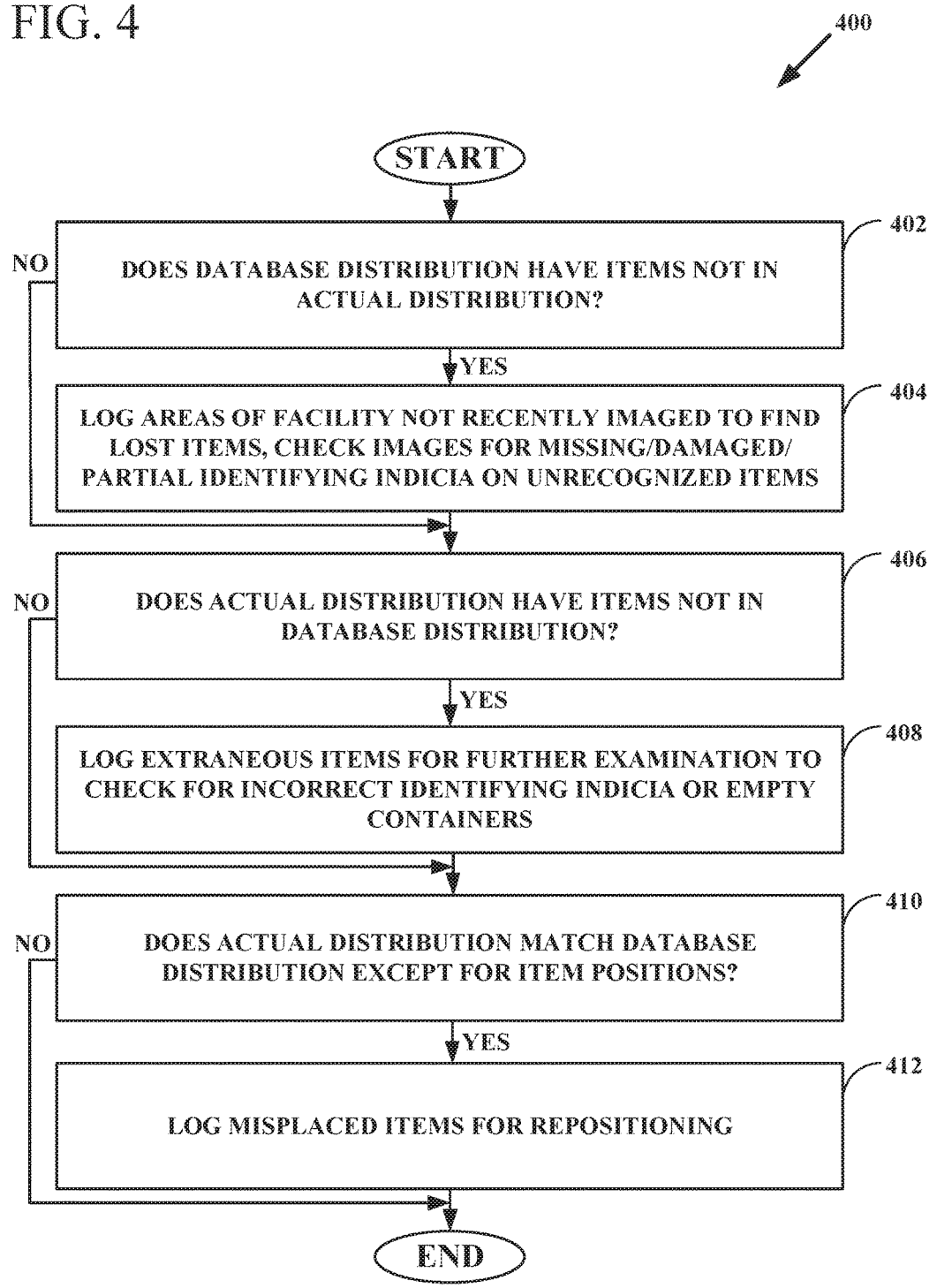
FIG. 4 is a flow chart illustrating a method for identifying discrepancies between database and actual inventory distributions and determining corrective actions, in accordance with a disclosed embodiment.

FIG. 4 is a flow chart illustrating a method 400 for identifying discrepancies between database and actual inventory distributions and determining corrective actions, in accordance with a disclosed embodiment. This method provides further detail regarding operation 312 of the previous figure. Particular types of discrepancies may lead to particular corrective actions to be taken for managing the inventory.

At 402, the method may determine if the database inventory distribution has items that are not found in the actual inventory distribution. That is, items that should be seen are not seen and are therefore missing. If so, at 404 the method may log particular areas of the inventory handling facility 100 that have not been recently imaged, in an attempt to discover lost items. The method may also check the images for items that have missing, damaged, or partially discernible identifying indicia.

At 406, the method may determine if the actual inventory distribution has items that are not in the database distribution. That is, identifiable items are evident on the image data but have no corresponding match in the database. If so, at 408 the method may log these extraneous items for further examination by a picking agent 114. In some cases, the recognized identifying indicia may be incorrect, which could be due to an error in the image processing software 210 and/or to damage or wear to the identifying indicia, or improper replacement of the identifying indicia. In some cases, the problem may be that an empty container with the identifying indicia was left on a shelf after an inventory item was removed for packing and shipping.

At 410, the method may determine if the actual inventory item distribution matches the database distribution except for the positions of inventory items. That is, the overall content of the inventory handling facility 100 may be correct, but items may be misplaced. If so, at 412 the method logs such misplaced items for subsequent repositioning.

In conventional inventory handling facilities, a periodic shutdown and review of the entire inventory may be undertaken to identify and correct these discrepancies. This unproductive time is costly and inefficient, and detrimental to both item providers and customers. The present inventor has realized that a better solution is to remedy these discrepancies by existing picking agents 114 while they are going about their normal picking tasks.

For example, the path optimizing software 212 that determines which picking agents 114 should pick particular items while traversing a particular route may now modify its overall objective. Instead of optimizing picking efficiency, the path optimizing software 212 may now incorporate corrective inventory management actions that may be taken by the picking agents 114 during their usual rounds. Thus, if an area of the inventory handling facility 100 has not been imaged recently to provide updated image data, such as to locate a lost item, the path optimizing software 212 may select a picking agent 114 that will be picking an item near that area and assign that picking agent 114 the additional task of gathering image data.

If the picking agent 114 is scheduled to traverse that area anyway, the new task adds no delay. If the picking agent 114 is scheduled to traverse a nearby area, the new task may add only a minor delay while the picking agent follows a slightly less than optimal route. If the picking agent 114 is wearing cameras that are active all the time, the picking agent 114 may not even be aware of the assignment of the new task. However, the picking agent 114 may be alerted to the details of the new task, such as to check for damaged or partially visible identifying indicia on unrecognized items.

Likewise, if an extraneous item has been detected in the image data but there is no corresponding item in the database model, the path optimizing software 212 may assign a corrective inventory management action to the picking agent 114 that has been assigned a regular task in the vicinity. The picking agent 114 may be alerted to check for empty containers for example that may have been left behind after an inventory item was picked. The picking agent 114 may also be asked to verify the identifying indicia for an extraneous item, in case the image processing software has made an error. As before, this new task may add little marginal effort to the usual tasks performed by the picking agent 114, but may avoid the need for other personal to investigate logged discrepancies.

Figure 5A:
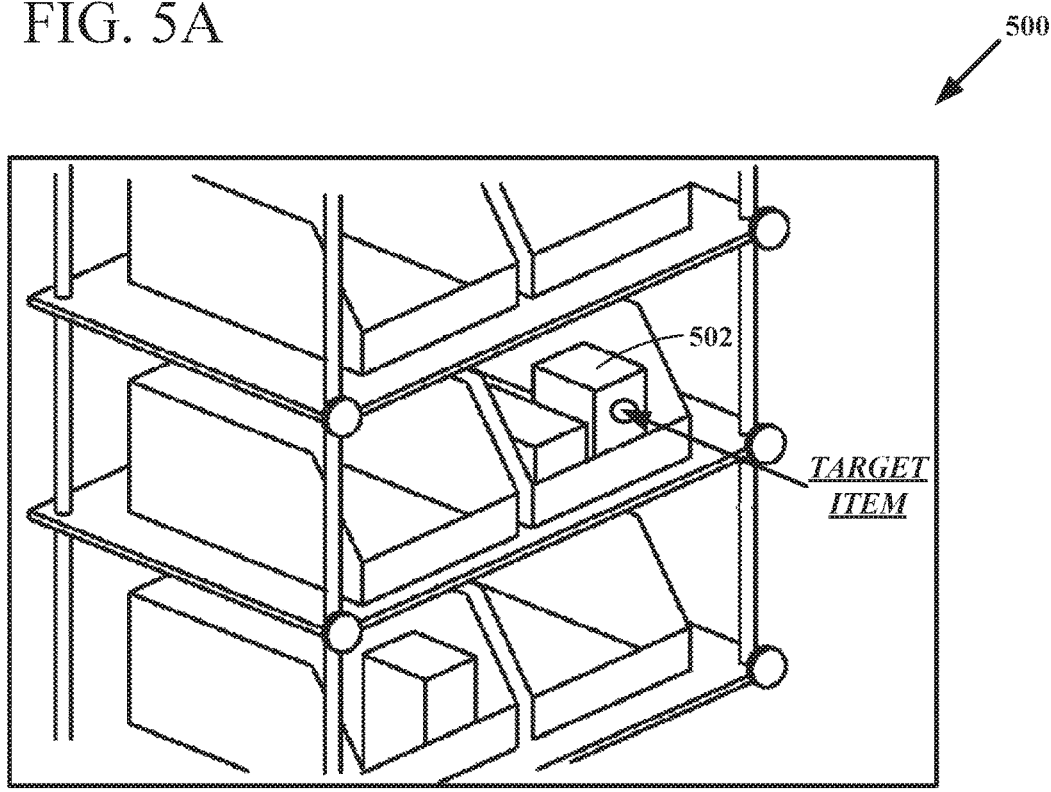
FIGS. 5A-5B are diagrammatic representations of an augmented reality display, in accordance with a disclosed embodiment.

FIG. 5A is a diagrammatic representation of an augmented reality display 500, in accordance with a disclosed embodiment. The term "augmented reality" may refer to a direct view of a physical region with additional visual information provided in an overlay. Wearable heads-up displays may take the form of glasses or goggles that provide a user with a mixed visual field comprising a normal view plus displayed augmentations. Such displays may include position sensors and orientation sensors to help provide an overlay that is seamless and coordinated with the direct view.

Other types of augmented reality equipment are known, and may include a tablet computer, smartphone, or personal digital assistant (PDA) for example. The equipment may depict on the display 500 a map of the route the picking agent 114 is to follow, a list of items and their identifiers to be picked, as well as an allotted time for the picking agent 114 to complete a particular task, for example. The equipment may also depict a list of coordinates where each item to be picked is supposed to be located according to the database inventory model and/or a list of coordinates where each item to be picked is actually located according to the image based inventory model. The equipment may also alert the picking agent 114 of a corrective inventory management action that is added to other tasks.

In this example, the display 500 may depict a view of a portion of a storage area, including perhaps a number of shelves, bins, location identifiers, and inventory items. The display 500 may also provide an overlay to help the picking agent 114 who is using or wearing the display identify an item to be picked, referred to in this description as a target item 502. For example, the display 500 may generate the words "TARGET ITEM", the leading arrow, and the circle shown to help the picking agent 114 determine that a particular target item 502 is to be picked. Although target item 502 is shown in a bin, this disclosure is not limited in that regard, as target item 502 could be anywhere within the inventory handling facility 100.

Figure 5B:
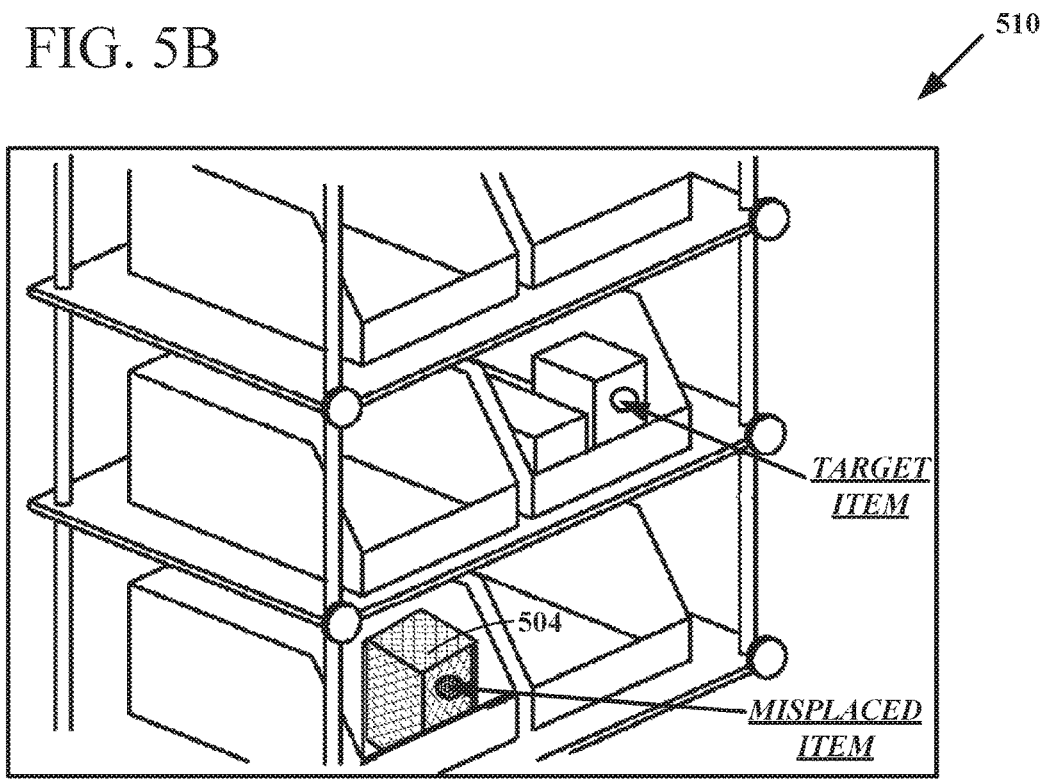

FIG. 5B is a diagrammatic representation of an augmented reality display 510, in accordance with a disclosed embodiment. This display differs from that of FIG. 5A in that a corrective inventory management action has been assigned to the picking agent 114 and an overlay is depicted to help the picking agent perform this corrective inventory management action in the course of other tasks. In this case, the image data includes a non-target item 504 that is in the database inventory model but has been misplaced.

The path optimizing software 212 has therefore logged the non-target item 504 to be repositioned. However, rather than send a dedicated person to move the non-target item 504 or halting picking operations to perform a review of the entire inventory, embodiments may modify the tasks assigned to the picking agent 114 to include a corrective inventory management action. The path optimizing software 212 may determine that the misplaced item (non-target item 504) is near a target item to be picked (target item 502 in this example), and may therefore assign the repositioning task to the picking agent 114 that has been assigned the task of picking the target item.

The corrective inventory management action may pose relatively little additional burden on this particular picking agent 114. The corrective inventory management action is easy for the picking agent 114 to perform "along the way" or while performing a routine picking action. The display 510 may provide an overlay to help identify the non-target item 504 to be picked for repositioning versus order fulfillment. In this case, the display 510 may generate the words "MISPLACED ITEM", the leading arrow, the shaded circle, and the shading over the non-target item 504. The display 510 may use any known means of highlighting items, including for example flashing and/or colored overlays.

In other examples, the augmented reality displays may denote regions of the inventory handling facility 100 that need to have updated image data acquired, or alternate mutes for a picking agent 114 to follow to avoid a collision with another picking agent 114 or other obstacle. Obstacles may include safety hazards such as spilled liquids, broken items, stalled automated picking agents, and other debris. The displays may also note the identifying indicia for missing items that need to be reoriented into clearer camera view by a picking agent 114 if seen by the picking agent 114. The displays may also note items with damaged or partially readable identifying indicia, so that the picking agent 114 may relabel or remove such items.

FIG. 6 is a flow chart illustrating a method 600 for executing corrective inventory management actions, in accordance with a disclosed embodiment. At 602, the method may find a combined optimal path for the picking agent 114 to pick a target item and also to take corrective inventory management action on a non-target item along the way. The path finding computations may be performed with the path optimizing software 212 or another program.

At 604, the method may provide the combined optimal path and the picking and corrective inventory management instructions to the picking agent 114. The method may also generate an overlay for depiction in a portable heads-up device, which may be used by a human picking agent 114, or the method may use more conventional equipment to communicate the picking and corrective action information.

Next, the picking agent may proceed to carry out its assigned picking task and also the various corrective inventory actions along the way. At 606, the method may instruct the picking agent 114 to acquire more image data and/or to reorient a specified non-target item. At 608, the method may instruct the picking agent 114 to replace the identifying indicia of a non-target item and/or to check its weight to determine if an empty container has been left behind in error.

At 610, the method may instruct the picking agent 114 to reposition the non-target item to a different position in the inventory handling facility 100. In one example, a particular destination for the non-target item may be specified, such as a particular shelf or bin in a storage area. In another example, all misplaced items may be moved to a common re-sorting area for subsequent handling, including being transported to a new position by another picking agent 114 who may be proceeding in that direction to perform a picking task.

In addition, the method may instruct the picking agent 114 to reposition the non-target item to a different position in the inventory handling facility 100 to help optimize operations more dynamically. For example, if part of the inventory handling facility 100 is too dark for cameras and human picking agents 114 to operate because of damaged lighting, inventory near that area may be moved to a better-lighted area over time. Similarly, if other maintenance tasks are required, or if areas of congestion are identified, the picking agents 114 may move non-target items during their picking actions for target items.

Items may also be repositioned to improve the overall operation of the inventory handling facility 100. For example, popular inventory items may be moved closer to a packing area. Different inventory items that are often bought together in an order may be stored in closer proximity to each other, so that a particular picking agent 114 may pick those items in a single trip.

The repositioning of items may also help avoid collisions between the picking agents 114 traversing congested areas. Congested areas may be determined by observation of the actual paths followed by the picking agents 114 and deviations observed from the optimal paths provided. Congested areas may impact picking times, so repositioning even when no items have been misplaced may prove advantageous. Thus, deliberate repositioning of items may help the inventory handling facility 100 become more self-organizing.

At 612, the method may provide a human picking agent 114 with an incentive for maximizing picking productivity while taking on the additional tasks associated with implementing a corrective inventory management action. In one example, a bonus may be paid for meeting a predetermined picking productivity measure, such as the number of items picked per hour without error. In another example, a bounty may be paid for performing corrective inventory management actions without a reduction in the picking agent's historical picking productivity measure.

In one example, the process of providing a human picking agent 114 with an incentive may involve treating the combined picking and correcting operation as a game. Maintaining human attention and motivation for a relatively repetitive job can be difficult, but picking agents 114 may compete with each other to score points in a game scenario. Competition among picking agents 114 to accomplish the combined picking and correcting operation may help increase productivity. Different picking agents 114 may monitor each other's progress or form teams to encourage task completion in group terms.

The methodology is described in terms of a warehousing scenario, but this disclosure is not so limited. For example, security guards may gather image data during routine patrols of an assigned area, and the resulting image based inventory model may note an unattended package that may be subjected to further treatment. Such an unattended package may be evaluated as a security risk and/or moved to a security area where merely lost items may be retrieved. Likewise, a building that should be empty may actually have trespassers who appear on the image data. The images of such trespassers may be distributed to a security guard, along with location data to help track them down.

Similarly, a building inspector may move through a building and gather image data, and the resulting image based model may confirm that the entire building has been imaged. Subsequent inspections may yield image data that can be compared with previous image data to determine if changes have occurred in the building. Such changes may direct subsequent maintenance-related corrective actions.

The system, method, and computer program product disclosed herein thus may provide improvements in management efficiency of a physical inventory. Accordingly, one or more of the methodologies discussed herein may obviate a need for additional personnel to track down misplaced inventory items, or for an order fulfillment center to halt productive operations to manually perform a review of the overall inventory and its actual distribution. Further, the use of cameras to gather image data of the actual inventory distribution may have the technical effect of reducing computing resources used by one or more devices within the system. Examples of such computing resources include, without limitation, processor cycles, network traffic, memory usage, storage space, and power consumption. For example, with an accurate model of the actual inventory distribution, an inventory handling facility may more easily determine the optimal picking agent routing to not only fulfill an order but also to implement various corrective inventory management actions along the way.

In one example, a method for dynamically managing a physical inventory may include constructing a three-dimensional model of inventory item distribution from image data in substantially real time, and designating a target item to be picked and a path to the target item, for a picking agent. The picking agent may perform a corrective inventory management action while picking the target item.

In another example, a system for dynamically managing a physical inventory may include a number of cameras that acquire image data for constructing a three-dimensional model of inventory item distribution in substantially real time, a picking agent that follows a designated path to a designated target item to be picked, and a database that determines a corrective inventory management action to be performed by the picking agent while picking the target item.

In a further example, a computer-readable hardware medium may store program instructions that, when executed by one or more processors, may perform operations for dynamically managing a physical inventory. The operations may include constructing a three-dimensional model of inventory item distribution from image data in substantially real time, and designating a target item to be picked, and a path to the target item, for a picking agent. A picking agent may perform a corrective inventory management action while picking the target item.

Modules, Components and Logic

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of some of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations thereof. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL). Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various APIs), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may, for example, include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally Asynchronous Transfer Mode (ATM), Systems Network Architecture (SNA), Serial Digital Interface (SDI), or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the embodiment. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Figure 7:
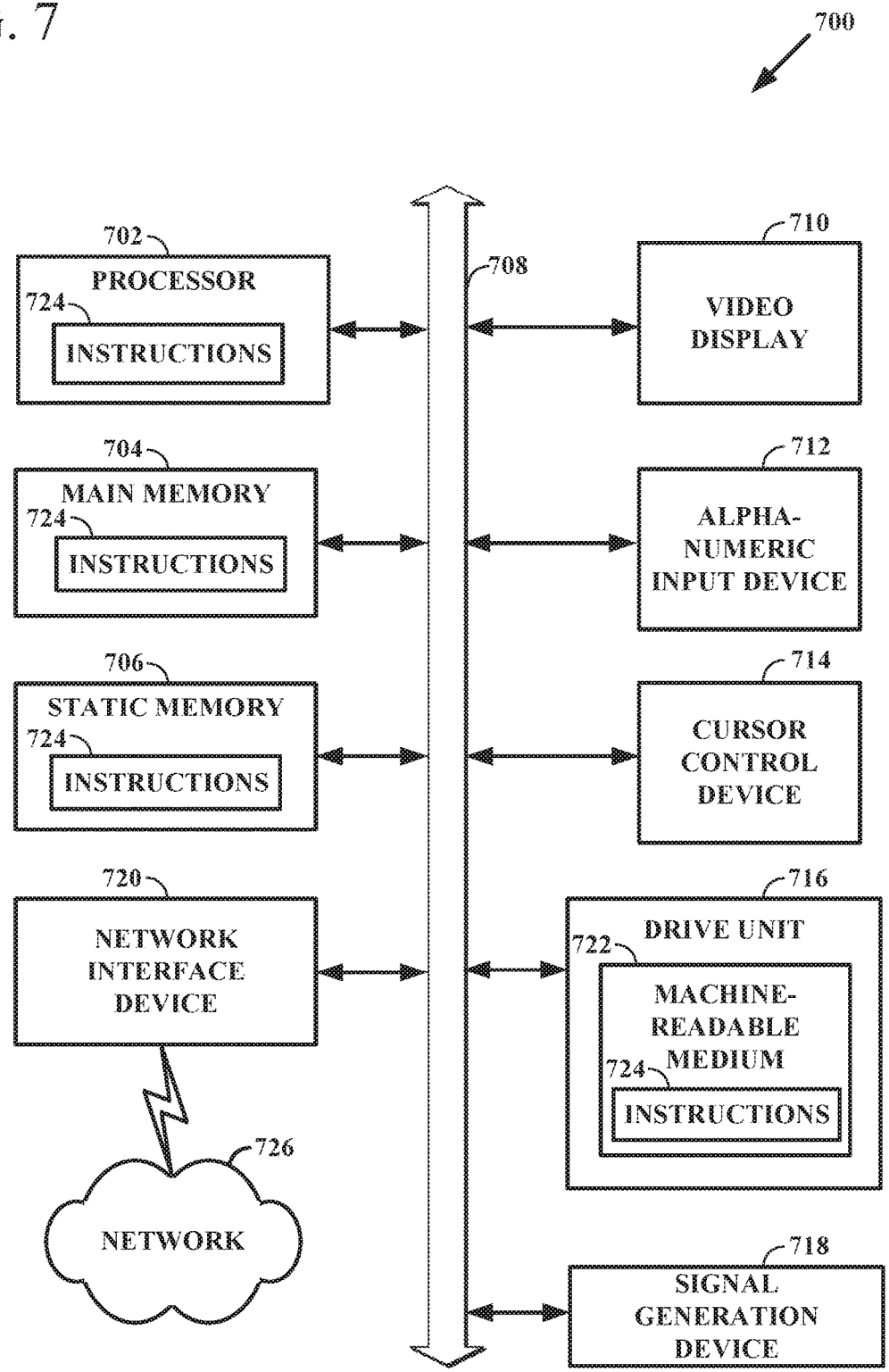
FIG. 7 is a block diagram of a machine in the example form of a computer system within which a set of instructions, for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a CPU, a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, and optical and magnetic media.

Thus, a method and system for dynamically managing a physical inventory have been described. Although the present method and system have been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
constructing a three-dimensional model of an inventory item distribution from image data in substantially real time;
designating a target item to be picked;
causing display of the target item as an overlay on a portable heads-up display worn by a human picking agent;
computing an optimal path for picking the target item;
dynamically identifying a corrective inventory management action to be performed on a non-target item; and
dynamically computing a combined optimal path for picking the target item and performing the corrective inventory management action on the non-target item.

2. The method of claim 1, wherein the image data is acquired by at least one of a camera attached to the picking agent, a camera attached to a mobile imaging device, and a camera attached to a fixed position.

3. The method of claim 1, wherein the corrective inventory management action is determined by comparing the three-dimensional model of inventory item distribution with a database model of inventory item distribution to identify a discrepancy regarding the non-target item.

4. The method of claim 1, wherein the corrective inventory management action includes at least one of repositioning the non-target item to a particular new storage location, reorienting the non-target item for better visibility of its identifying indicia, replacing identifying indicia of the non-target item, assessing a weight of the non-target item, and gathering new image data along the path.

5. The method of claim 4, wherein the repositioning includes at least one of repositioning inventory items away from areas needing maintenance, repositioning popular inventory items closer to a packing area, repositioning inventory items that are often purchased together into closer proximity, and repositioning inventory items to avoid collisions between picking agents.

6. The method of claim 1, further comprising incentivizing a human picking agent for an action that increases inventory management efficiency including at least one of performing the corrective inventory management action, increasing a picking rate, and monitoring a task performed by another picking agent.

7. A non-transitory computer-readable storage medium having embedded therein a set of instructions which, when executed by one or more processors of a computer, causes the computer to perform operations comprising:
constructing a three-dimensional model of an inventory item distribution from image data in substantially real time;
designating a target item to be picked;
causing display of the target item as an overlay on a portable heads-up display worn by a human picking agent; computing an optimal path for picking the target item; and
dynamically identifying a corrective inventory management action to be performed on a non-target item; and
dynamically computing a combined optimal path for picking the target item and taking the corrective inventory management action on the non-target item.

8. The medium of claim 7, wherein the image data is acquired by at least one of a camera attached to the picking agent, a camera attached to a mobile imaging device, and a camera attached to a fixed position.

9. The medium of claim 7, wherein the corrective inventory management action is determined by comparing the three-dimensional model of inventory item distribution with a database model of inventory item distribution to identify a discrepancy regarding the non-target item.

10. The medium of claim 7, wherein the corrective inventory, management action includes at least one of repositioning the non-target item to a particular new storage location, reorienting the non-target item for better visibility of its identifying indicia, replacing identifying indicia of the non-target item, assessing a weight of the non-target item, and gathering new image data along the path.

11. The medium of claim 10, wherein the repositioning includes at least one of repositioning inventory items away from areas needing maintenance, repositioning popular inventory items closer to a packing area, repositioning inventory items that are often purchased together into closer proximity, and repositioning inventory items to avoid collisions between picking agents.

12. The medium of claim 7, further comprising incentivizing a human picking agent for an action that increases inventory management efficiency, including at least one of performing the corrective inventory management action, increasing a picking rate, and monitoring a task performed by another picking agent.

13. A system comprising:
a memory to store computer executable instructions;
at least one computer processor coupled to the memory to execute the instruction, that upon execution perform operations comprising:
constructing a three-dimensional model of inventory item distribution from image data in substantially real time;
designating a target item to be picked;
computing an optimal path for picking the target item;
dynamically identifying a corrective inventory management action to be performed on a non-target item;
dynamically computing a combined optimal path for picking the target item and taking the corrective inventory management action on the non-target item; and
causing display of the target item and the combined optimal path as an overlay on a portable heads-up display worn by a human picking agent.

14. The system of claim 13, wherein the cameras comprise at least one of a camera attached to the picking agent, a camera attached to a mobile imaging device; and a camera attached to a fixed position.

15. The system of claim 13, wherein the database determines the corrective inventory management action by comparing the three-dimensional model of inventory item distribution with a database model of inventory item distribution to identify a discrepancy, regarding the non-target item.

16. The system of claim 13, wherein the corrective inventory management action includes at least one of repositioning the non-target item to a particular new storage location, reorienting the non-target item for better visibility of its identifying indicia, replacing identifying indicia of the non-target item, assessing a weight of the non-target item, and gathering new image data along the path.

17. The system of claim 16, wherein the repositioning includes at least one of repositioning inventory items away from areas needing maintenance, repositioning popular inventory items closer to a packing area, repositioning inventory items that are often purchased together into closer proximity, and repositioning inventory items to avoid collisions between picking agents.

* * * * *